Dec. 16, 1958     G. A. LYON     2,864,470
WHEEL COVER
Filed May 22, 1956
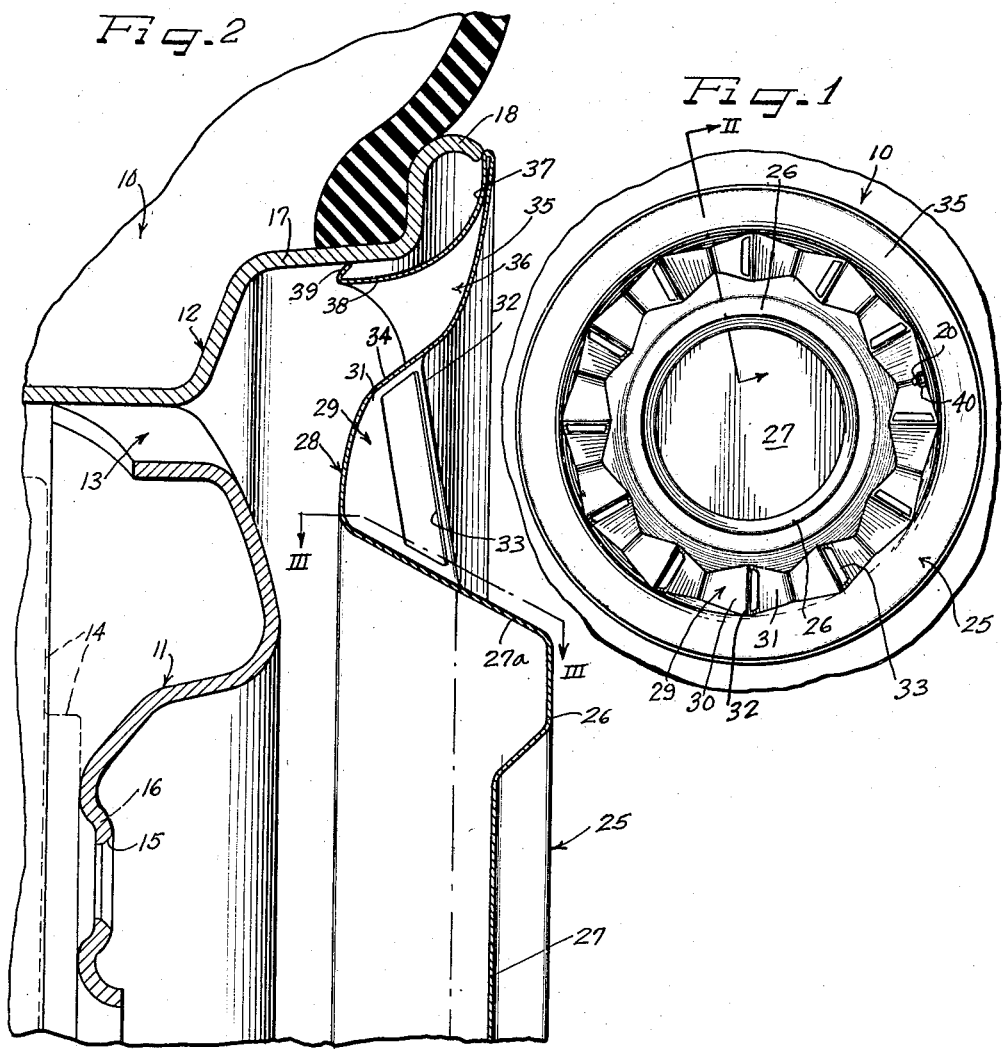
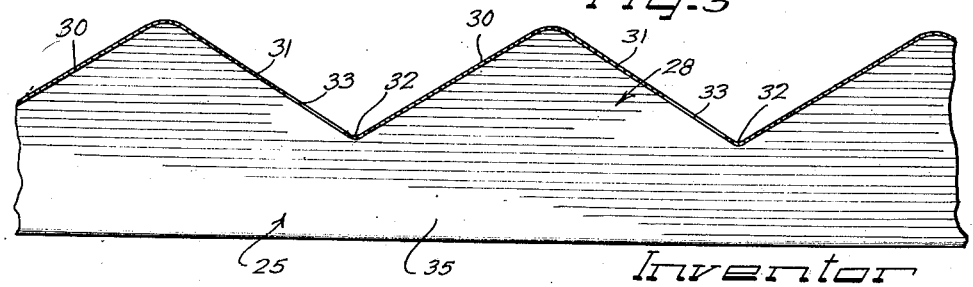
INVENTOR
GEORGE ALBERT LYON
Attys.

United States Patent Office 2,864,470
Patented Dec. 16, 1958

2,864,470

WHEEL COVER

George Albert Lyon, Detroit, Mich.

Application May 22, 1956, Serial No. 586,441

4 Claims. (Cl. 188—264)

This invention relates generally to a wheel structure and more particularly to an ornamental wheel cover for overlying protective disposition upon the wheel with the cover and its relationship with the wheel facilitating in the circulation of air to cool the brake drum area of the wheel.

With the development of automotive vehicles and the like capable of attaining greater and greater forward speeds proper braking of the vehicle has become a considerable problem. Another aspect of this problem is presented where reduced diameter wheels are utilized which now appears to be the trend in the industry. The smaller wheels have a smaller surface area from which any heat build-up may be dispersed tending to increase the temperature of the vehicle wheel when in use under normal road conditions.

Accordingly, an object of this invention is to provide a new ornamental wheel cover member having cover openings which lend themselves to promoting air circulation to cool the brake drum area of the wheel along with the body and rim members.

Another object of this invention is to provide a cover which is particularly adapted to creating an aspirating effect when the cover is in assembly upon a vehicle wheel.

Still another object of this invention is to provide a new and improved highly ornamental cover construction which lends itself to economical manufacture on a large production basis, and which may be maintained on a vehicle wheel in detachable snap-on, pry-off relation.

According to the general features of this invention there is provided in a wheel structure including a wheel adapted to forwardly move and rotate and having rim and body parts and wheel openings disposed generally opposite the brake drum area of the wheel structure, an ornamental wheel cover for overlying protective disposition upon the outer side of the wheel with means between the cover and wheel for maintaining the cover in detachable assembly therewith, the cover having an outer margin in bottomed engagement upon the wheel and defining a substantially enclosed pocket between the cover and wheel, the cover having an intermediate dished portion provided with circumferentially spaced generally radially extending raised portions, each having a peak with the peaks lying generally in a common vertical plane, the raised portions including an inclined portion extending generally away from the direction of rotation of the wheel and a cover opening in the inclined portion disposed generally opposite the wheel opening with a slip stream of air moving rearwardly on the outer side of the forwardly moving and rotating wheel tending to create a low pressure area axially behind the plane of the peaks and with the centrifugal forces of the wheel forcing the air outwardly from an inner area between the cover and wheel for drawing air from brake drum area and inner area through the substantially enclosed pocket and cover openings creating an aspirating effect to circulate air and cool the brake drum area and wheel.

Another feature of the present invention relates to the provision of circumferentially spaced generally radially extending ribs with the ribs having an inclined portion extending generally away from the direction of rotation of the wheel and a cover opening on said inclined portion whereby a slip stream of air moving rearwardly on the outer side of the forwardly moving and rotating wheel tends to create a low pressure area between the ribs facilitating the creation of an aspiring effect to cool the wheel.

Other objects and features of the present invention will more fully become apparent in view of the following detailed description taken in conjunction with the accompanying drawings illustrating therein a single embodiment in which:

Figure 1 is a side elevation of my wheel structure;

Figure 2 is an enlarged fragmentary cross sectional view taken substantially on the line II—II of Figure 1 looking in the direction indicated by the arrows; and Figure 3 is an enlarged cross sectional view taken substantially on the line III—III of Figure 2 looking in the direction indicated by the arrows.

As shown on the drawings:

The reference numeral 10 indicates generally my wheel structure including body and rim parts 11 and 12 respectively and with wheel openings 13 generally at the junction of the rim and body parts. The body part 11 is positioned adjacent a brake drum 14 carried generally at the axially inner side of the wheel. The wheel is adapted to be fastened to an axle (not shown) of a vehicle by inserting bolts through the openings 15 in the bolt on flange 16 of the body part 11. Afterwards, bolts may then be fastened onto the screws or lugs to clamp the body part 11 to the axle in a conventional manner.

The tire rim 12 is of the multi-stepped flange type including an intermediate generally axially extending flange 17 and a terminal flange 18 which also extends generally axially. Carried on the tire rim is a more or less conventional tire assembly which may be either of a tube or tubeless type and which is adapted to be inflated by means of a valve stem 20.

Disposed on the outer side of the vehicle wheel is my ornamental wheel cover member 25 which may be made of any suitable material although excellent results may be attained by making the cover from stainless spring steel.

The cover 25 includes a central raised crown 26; the crown 26 being dished at 27. The radially outer margin of the crown 26 is defined by an annular generally axially inwardly radially outwardly extending cover portion 27a; the portion 27a comprises a side wall portion of an intermediate dished portion 28 of the cover. Pressed generally axially outwardly from the dished portion 28 at circumferentially spaced intervals are generally radially extending raised portions or ribs 29.

The ribs 29 include converging inclined portions 30 and 31 junctioned at a common peak 32. Provided on the inclined portion 31 of each of the ribs 29 is a cutout cover opening or slot 33. It will be appreciated, the opening 33 may be on either of the inclined portions 30 and 31 depending on whether the cover is a left or right handed cover.

The peaks 32 lie in a common vertical plane such that as the air flows in the dished or channeled portion 28, a low pressure area is set up axially to the rear of the plane of the peaks, and particularly between the ribs. Also, the slots 33 are positioned immediately adjacent the peaks 32 to make the best possible advantage of the slip stream air flow as the wheel structure 10 is forwardly moved and rotated.

The dished portion 28 is defined at its outer side by a generally radially and axially outwardly extending portion 34 which merges with cover margin 35; margin 35 being bottomly engaged against the terminal rim flange 18 to define a substantially enclosed pocket between the cover and the wheel.

Integrally formed on the cover are retaining extensions 36 which extensions 36 are connected to the cover by an underturned annular flange portion 37 which is underturned and underlies the cover margin 35. Each of the extensions 36 is resilient and includes an elongated generally axial resilient portion 38 and a short stiff biting gripping terminal 39 which in this instance is adapted to detachably bite into the intermediate rim flange 17.

The cover may be assembled upon the wheel by first aligning the valve stem 20 with a cover opening 40 and in this manner the extensions 36 are more or less aligned with the intermediate axial rim flange 17. Since the extensions 36 normally lie in a circle having a diameter slightly larger than the inside diameter of the intermediate rim flange 17 the extensions 36 may be placed under tension as they are stressed generally radially inwardly as the cover is pressed upon the wheel.

To remove the cover 25 from the wheel, a suitable pry-off tool may be inserted underneath the outer margin 35 of the wheel and upon the application of a suitable pry-off force the cover may be forcibly ejected from the wheel.

In the operation of the wheel structure, as illustrated, the wheel is initially caused to move forwardly and rotate in a clockwise direction. As the wheel is moved forward and rotated slip streams of air move rearwardly relative to the wheel, with at least portions of the stream being directed into the channeled dished area 28 over the peaks 32 to set up a low pressure area between the peaks and to a limited extent behind the cover. As the wheel rotates, centrifugal forces are set up by the wheel and which tend to urge the air contained in the inner area between the body part and elevated crown 26 radially outwardly. This movement of air coupled with the pressure differentials tends to pull the air from the brake drum area to the wheel openings and out through the cover openings 33 to create an aspirating effect to facilitate the cooling of the brake drum and wheel. By bottoming the cover upon the terminal rim flange 18 the air movement may be increased through the openings 33 as a substantially enclosed pocket is provided between the cover and wheel with the exception of the wheel and cover openings.

The present cover is believed to be particularly advantageous in view of the fact it combines a number of features including being ornamental in appearance, being relatively economical to manufacture in that the cover may be stamped out from a sheet of material, and lending itself to creating an aspirating effect for promoting air circulation by virtue of the particular configuration of the cover.

It will be understood that modifications and variations may be effected without departing from the scope of the novel concepts of the present invention, but it is understood that this application is to be limited only by the scope of the appended claims.

I claim as my invention:

1. In a wheel structure including a wheel adapted to forwardly move and rotate and having rim and body parts and wheel openings disposed generally opposite the brake drum area of the wheel structure, an ornamental wheel cover for overlying protective disposition upon the outer side of the wheel with means between the cover and wheel for maintaining the cover in detachable assembly therewith, said cover having an outer margin in bottomed engagement upon the wheel and defining a substantially enclosed pocket between the cover and wheel, said cover having an intermediate dished portion provided with circumferentially spaced generally radially extending raised portions, each having a peak with said peaks lying generally in a common vertical plane, said raised portions including an inclined portion extending generally away from the direction of rotation of the wheel and a cover opening in said inclined portion disposed generally opposite the wheel opening with a slip stream of air moving rearwardly on the outer side of the forwardly moving and rotating wheel tending to create a low pressure area axially behind the plane of said peaks and with the centrifugal forces of the wheel forcing the air outwardly from an inner area between the cover and wheel for drawing air from brake drum area and inner area through said substantially enclosed pocket and cover openings creating an aspirating effect to circulate air and cool the brake drum area and wheel.

2. In a wheel structure including a wheel adapted to forwardly move and rotate and having rim and body parts and wheel openings disposed generally opposite the brake drum area of the wheel structure, an ornamental wheel cover for overlying protective disposition upon the outer side of the wheel with means between the cover and wheel for maintaining the cover in detachable assembly therewith, said cover having an outer margin in bottomed engagement upon the wheel and defining a substantially enclosed pocket between the cover and wheel, said cover having an intermediate cover portion provided with circumferentially spaced generally radially extending raised portions, each having a peak with said peaks lying generally in a common vertical plane, said raised portions including an inclined portion extending generally away from the direction of rotation of the wheel and a cover opening in said inclined portion disposed generally opposite the wheel opening with a slip stream of air moving rearwardly on the outer side of the forwardly moving and rotating wheel tending to create a low pressure area axially behind the plane of said peaks and with the centrifugal forces of the wheel forcing the air outwardly from an inner area between the cover and wheel for drawing air from brake drum area and inner area through said substantially enclosed pocket and cover openings creating an aspirating effect to circulate air and cool the brake drum area and wheel, said means comprising resilient cover retaining extensions carried by said cover to maintain said cover in snap-off, snap-on relation to the wheel.

3. In a wheel structure including a wheel adapted to forwardly move and rotate and having rim and body parts and wheel openings disposed generally opposite the brake drum area of the wheel structure, an ornamental wheel cover for overlying protective disposition upon the outer side of the wheel with means between the cover and wheel for maintaining the cover in detachable assembly therewith, said cover having an outer margin disposed in overlying relationship upon the wheel, said cover having an intermediate dished portion provided with circumferentially spaced generally radially extending ribs, each having a peak with said peaks lying generally in a common vertical plane, said ribs including an inclined portion extending generally away from the direction of rotation of the wheel and a cover opening in said inclined portion disposed generally opposite the wheel opening with a slip stream of air moving rearwardly on the outer side of the forwardly moving and rotating wheel tending to create a low pressure area axially behind the plane of said peaks and with the centrifugal forces of the wheel forcing the air outwardly from an inner area between the cover and wheel for drawing air from brake drum area and inner area through said cover openings creating an aspirating effect to circulate air and cool the brake drum area and wheel.

4. In a wheel structure including a wheel adapted to move and rotate forwardly having rim and body parts and wheel openings disposed generally opposite a brake drum area of the wheel, an ornamental wheel cover for overlying protective disposition upon the outer side of the wheel with means between said cover and wheel for maintaining said cover in detachable relation therewith, said cover having an outer margin in bottomed engagement upon the wheel defining a generally enclosed pocket, said cover having an intermediate portion provided with circumferentially spaced generally radially extending rib-like portions, each having a peak, said rib-like portions including an inclined portion extending generally away from the direction of rotation of the wheel and a cover opening in said inclined portion disposed generally opposite the wheel opening to facilitate the circulation of air to cool the brake drum area and wheel with a slip stream of air moving rearwardly on the outer side of the wheel tending to create a low pressure area between said peaks and with the centrifugal forces of the wheel forcing the air radially outwardly from the inner area between the wheel and cover to the end of drawing the air from the brake drum area and the inner area of the wheel and cover creating an aspirating effect.

References Cited in the file of this patent

UNITED STATES PATENTS

| | | |
|---|---|---|
| D. 171,303 | Lyon | Jan. 19, 1954 |
| 2,682,937 | Lyon | July 6, 1954 |